United States Patent
Komada et al.

(10) Patent No.: US 11,396,343 B2
(45) Date of Patent: Jul. 26, 2022

(54) OPERATING DEVICE FOR HUMAN-POWERED VEHICLE

(71) Applicant: SHIMANO INC., Sakai (JP)

(72) Inventors: Yasuyuki Komada, Sakai (JP); Shun Kakehashi, Sakai (JP); Takuma Sakai, Sakai (JP)

(73) Assignee: SHIMANO INC., Sakai (JP)

(*) Notice: Subject to any disclaimer, the term of this patent is extended or adjusted under 35 U.S.C. 154(b) by 0 days.

(21) Appl. No.: 16/864,163

(22) Filed: May 1, 2020

(65) Prior Publication Data

US 2021/0339818 A1   Nov. 4, 2021

(51) Int. Cl.
*B62K 23/06*   (2006.01)

(52) U.S. Cl.
CPC .................. *B62K 23/06* (2013.01)

(58) Field of Classification Search
None
See application file for complete search history.

(56) References Cited

U.S. PATENT DOCUMENTS

| | | | | |
|---|---|---|---|---|
| 5,676,021 A * | 10/1997 | Campagnolo | .......... | B62K 23/06 116/28.1 |
| 7,049,944 B2 * | 5/2006 | Uno | ......... | B62J 99/00 340/432 |
| 7,679,494 B2 * | 3/2010 | Fujii | ............... | B62M 25/08 340/432 |
| 2007/0193497 A1 * | 8/2007 | Iteya | ........ | B62K 23/02 116/28.1 |
| 2012/0221205 A1 * | 8/2012 | Ichida | ........ | B62K 23/02 701/37 |
| 2012/0299476 A1 * | 11/2012 | Roberts | ........ | B60Q 1/2607 315/77 |
| 2014/0015659 A1 | 1/2014 | Tetsuka | | |
| 2017/0305488 A1 * | 10/2017 | Komatsu | ........ | B62K 23/06 |
| 2019/0185109 A1 | 6/2019 | Howell-Mclean et al. | | |

FOREIGN PATENT DOCUMENTS

GB    2572818 A   * 10/2019 ............. B62L 3/02

* cited by examiner

*Primary Examiner* — Vicky A Johnson
(74) *Attorney, Agent, or Firm* — Mori & Ward, LLP

(57) ABSTRACT

An operating device for a human-powered vehicle comprises a base member and an operating member. The base member extends in a longitudinal direction. The base member includes a first end portion and a second end portion. The first end portion has a coupling surface configured to be coupled to a handlebar. The second end portion includes a pommel portion and an end surface extending from the pommel portion. The end surface is arranged on a reverse side of the coupling surface in the longitudinal direction. The operating member is movably coupled to the base member about a pivot axis between a rest position and an operated position. The operating member extends from a proximal end portion to a distal end portion in an extending direction. The indicator is configured to indicate information relating to the human-powered vehicle. The indicator is provided to the end surface.

22 Claims, 11 Drawing Sheets

OPERATING DEVICE FOR HUMAN-POWERED VEHICLE

BACKGROUND OF THE INVENTION

Field of the Invention

The present invention relates to an operating device for a human-powered vehicle.

Discussion of the Background

A human-powered vehicle includes an operating unit configured to operate an operated unit.

SUMMARY OF THE INVENTION

In accordance with a first aspect of the present invention, an operating device for a human-powered vehicle comprises a base member and an operating member. The base member extends in a longitudinal direction. The base member includes a first end portion and a second end portion. The first end portion has a coupling surface configured to be coupled to a handlebar. The second end portion is opposite to the first end portion in the longitudinal direction. The second end portion includes a pommel portion and an end surface extending from the pommel portion. The end surface is arranged on a reverse side of the coupling surface in the longitudinal direction. The operating member is movably coupled to the base member about a pivot axis between a rest position and an operated position. The operating member extends from a proximal end portion to a distal end portion in an extending direction. The indicator is configured to indicate information relating to the human-powered vehicle. The indicator is provided to the end surface.

With the operating device according to the first aspect, it is possible to utilize the end surface of the second end portion as a part in which the indicator is arranged.

In accordance with a second aspect of the present invention, the operating device according to the first aspect is configured so that the indicator is arranged so as to be hidden from sight as viewed along the extending direction from the pommel portion.

With the operating device according to the second aspect, it is possible to restrict the indicator from causing the user to lose concentration during riding whereas the user can check the information indicated by the indicator.

In accordance with a third aspect of the present invention, the operating device according to the first or second aspect is configured so that the base member includes a grip portion provided between the first end portion and the second end portion in the longitudinal direction. The grip portion includes a grip surface on which a user's hand is arranged. The second end portion is provided on a reverse side of the grip surface.

With the operating device according to the third aspect, it is possible to utilize the indicator for a road-type operating device.

In accordance with a fourth aspect of the present invention, the operating device according to any of the first to third aspects is configured so that the base member includes a base body and a cover configured to be attached to the base body to at least partly cover the base body. The indicator is provided to the end surface so as to be exposed from the cover.

With the operating device according to the fourth aspect, it is possible to restrict the cover from interfering the indicator.

In accordance with a fifth aspect of the present invention, the operating device according to any one of the first to fourth aspects is configured so that the indicator includes a light transmission member provided to the end surface of the second end portion.

With the operating device according to the fifth aspect, it is possible to transmit light of the indicator if the indicator uses light.

In accordance with a sixth aspect of the present invention, the operating device according to the fifth aspect is configured so that the light transmission member is made of a transparent material having light transparency.

With the operating device according to the sixth aspect, it is possible to reliably transmit light of the indicator through the light transmission member if the indicator uses light.

In accordance with a seventh aspect of the present invention, the operating device according to the fifth or sixth aspect is configured so that the indicator includes a light emitter configured to emit light. The light emitter is provided in a position where light emitted from the light emitter passes through the light transmission member to an outside space of the operating device.

With the operating device according to the seventh aspect, the indicator can indicate the information relating to the human-powered vehicle using light.

In accordance with an eighth aspect of the present invention, the operating device according to the seventh aspect is configured so that the light emitter is configured to emit light having a plurality of different colors.

With the operating device according to the eighth aspect, the indicator can indicate the information relating to the human-powered vehicle using light having the plurality of different colors. Thus, it is possible to increase the amount of the information indicated by the indicator.

In accordance with a ninth aspect of the present invention, the operating device according to any one of the fifth to eighth aspects is configured so that the end surface is made of a colored material which is free of light transparency or which has first light transparency. The light transmission member is made of a transparent material having second light transparency higher than the first light transparency of the end surface.

With the operating device according to the ninth aspect, it is possible to limit an area in which the indicator indicates the information. This makes the information indicated by the indicator clear.

In accordance with a tenth aspect of the present invention, the operating device according to any one of the fifth to ninth aspects is configured so that the light transmission member is embedded in the end surface.

With the operating device according to the tenth aspect, it is possible to simplify the structures of the light transmission member and the end surface.

In accordance with an eleventh aspect of the present invention, the operating device according to any one of the fifth to tenth aspects is configured so that the light transmission member includes a light emitting surface provided on the end surface. The light emitting surface extends along a pivot axis direction with respect to the pivot axis as viewed in the longitudinal direction.

With the operating device according to the eleventh aspect, it is possible to improve visibility of the information indicated by the indicator in the pivot axis direction with restricting the indicator from causing the user to lose concentration during riding.

In accordance with a twelfth aspect of the present invention, the operating device according to any one of the fifth to eleventh aspect is configured so that the second end portion includes a lateral surface and an additional lateral surface provided on a reverse side of the lateral surface in a pivot axis direction parallel to the pivot axis. The light transmission member includes a light emitting surface provided on the end surface. The center of the light emitting surface is offset from a transverse center plane of the second end portion towards one of the lateral surface and the additional lateral surface.

With the operating device according to the twelfth aspect, it is possible to improve visibility of the information indicated by the indicator in the pivot axis direction with restricting the indicator from causing the user to lose concentration during riding.

In accordance with a thirteenth aspect of the present invention, the operating device according to any one of the first to twelfth aspects is configured so that the end surface includes an inclined surface configured to face downward in a mounting state where the coupling surface is coupled to the handlebar. The indicator is provided to the inclined surface of the end surface.

With the operating device according to the thirteenth aspect, it is possible to reliably restrict the indicator from causing the user to lose concentration during riding In accordance with a fourteenth aspect of the present invention, an operating device for a human-powered vehicle comprises a base member, an operating member, and an indicator. The base member is configured to be coupled to a handlebar. The operating member is movably coupled to the base member. The indicator is configured to indicate information relating to the human-powered vehicle. The indicator includes a light transmission member integrally provided to the base member. The light transmission member is made of a colored transparent material having light transparency.

With the operating device according to the fourteenth aspect, it is possible to control balance between the color of the colored transparent material of the light transmission member and a color of a neighboring member of the light transmission member. Furthermore, the user can easily check and/or compare the information indicated by the indicator.

In accordance with a fifteenth aspect of the present invention, the operating device according to the fourteenth aspect is configured so that the indicator is provided at one of the base member and the operating member.

With the operating device according to the fifteenth aspect, it is possible to improve flexibility of choosing a position of the indicator in the operating device.

In accordance with a sixteenth aspect of the present invention, the operating device according to the fourteenth or fifteenth aspect is configured so that the indicator includes a light emitter configured to emit light. The light emitter is provided in a position where light emitted from the light emitter passes through the light transmission member to an outside space of the operating device.

With the operating device according to the sixteenth aspect, it is possible to indicate the information relating to the human-powered vehicle using light emitted by the light emitter.

In accordance with a seventeenth aspect of the present invention, the operating device according to the fourteenth aspect is configured so that the base member includes a base body and a cover attached to the base body to cover the base body. The light transmission member is provided to the base body so as to be exposed from the cover.

With the operating device according to the seventeenth aspect, it is possible to restrict the cover from interfering the indicator.

In accordance with an eighteenth aspect of the present invention, the operating device according to the seventeenth aspect is configured so that the base body is made of a colored material which is free of light transparency or which has first light transparency. The light transmission member is made of a transparent material having second light transparency higher than the first light transparency of the base body.

With the operating device according to the eighteenth aspect, it is possible to reliably transmit light of the indicator through the light transmission member if the indicator uses light.

In accordance with a nineteenth aspect of the present invention, the operating device according to any one of the fourteenth to nineteenth aspects is configured so that the light transmission member is formed by molding.

With the operating device according to the nineteenth aspect, it is possible to improve flexibility of design of the light transmission member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
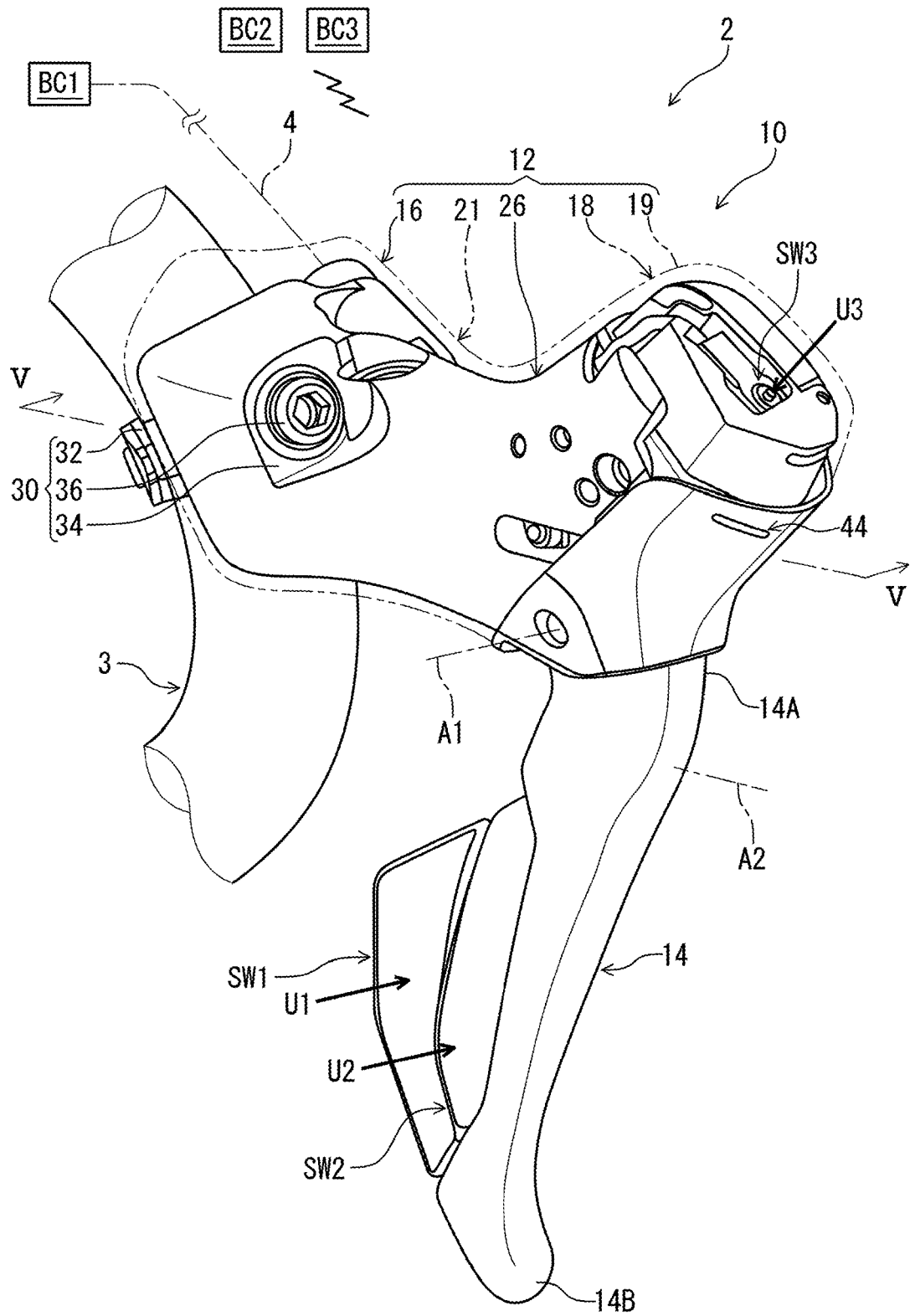
FIG. 1 is a perspective view of an operating device in accordance with an embodiment.

The embodiment(s) will now be described with reference to the accompanying drawings, wherein like reference numerals designate corresponding or identical elements throughout the various drawings.

As seen in FIG. 1, an operating device 10 for a human-powered vehicle 2 is configured to be mounted to a handlebar 3. In the present embodiment, the operating device 10 is configured to be mounted to a drop-down handlebar. However, structures of the operating device 10 can be applied to other operating devices mounted to other type of handlebars such as a flat handlebar, a time trial handlebar, and a bull horn handlebar.

For example, the human-powered vehicle 2 is a vehicle to travel with a motive power including at least a human power of a user who rides the human-powered vehicle 2 (i.e., rider). The human-powered vehicle 2 has an arbitrary number of wheels. For example, the human-powered vehicle 2 has at least one wheel. In the present embodiment, the human-powered vehicle 2 preferably has a smaller size than that of a four-wheeled automobile. However, the human-powered vehicle 2 can have an arbitrary size. For example, the human-powered vehicle 2 can have a larger size than that of the four-wheeled automobile. Examples of the human-powered vehicle 2 include a bicycle, a tricycle, and a kick scooter. In the present embodiment, the human-powered vehicle 2 is a bicycle. An electric assisting system including an electric motor can be applied to the human-powered vehicle 2 (e.g., the bicycle) to assist muscular motive power of the user. Namely, the human-powered vehicle 2 can be an E-bike.

The operating device 10 is operatively coupled to at least one device to operate the at least one device. In the present embodiment, the operating device 10 is operatively coupled to an operated device BC1 such as a brake device. The operating device 10 is operatively coupled to the operated device BC1 via a hydraulic hose 4. However, the operating device 10 can be operatively coupled to a mechanical component such as a brake device via a mechanical control cable including an inner wire. The operated device BC1 can include devices other than a brake device.

The operating device 10 is electrically connected to an electric component BC2 and an additional electric component BC3. In the present embodiment, the operating device 10 is wirelessly connected to the electric component BC2 and the additional electric component BC3. However, the operating device 10 can be connected to the electric component BC2 and the additional electric component BC3 via an electrical control cable.

Examples of the electric component BC2 and the additional electric component BC3 include an additional or satellite operating device, an adjustable seatpost, a suspension, a gear changing device, a brake device, a lighting device, and a display device. In the present embodiment, the electric component BC2 includes a gear shifting device such as a derailleur. The additional electric component BC3 includes an adjustable seatpost. However, the electric component BC2 and the additional electric component BC3 are not limited to the above devices.

In the present embodiment, the operating device 10 is a right-hand side operating/control device configured to be operated by the rider's right hand to actuate the operated device BC1. However, the structures of the operating device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or seat) in the human-powered vehicle 2 with facing the handlebar 3. Accordingly, these terms, as utilized to describe the operating device 10 or other components, should be interpreted relative to the human-powered vehicle 2 equipped with the operating device 10 as used in an upright riding position on a horizontal surface.

The operating device 10 comprises switches SW1, SW2, and SW3. The switch SW1 is configured to be activated in response to a user input U1. The switch SW2 is configured to be activated in response to a user input U2. The switch SW3 is configured to be activated in response to a user input U3. In the present embodiment, the electric component BC2 is configured to be operated in response to the user inputs U1 and U2 of the switches SW1 and SW2. The additional electric component BC3 is configured to be operated in response to the user input U3 of the switch SW3. For example, the electric component BC2 is configured to upshift and downshift in response to the user inputs U1 and U2 received by the switches SW1 and SW2. The additional electric component BC3 is configured to change a state of the additional electric component BC3 between a lock state and an adjustable state in response to the user input U3 received by the switch SW3. However, each of the switches SW1 to SW3 can be used to operate other devices.

Figure 2:
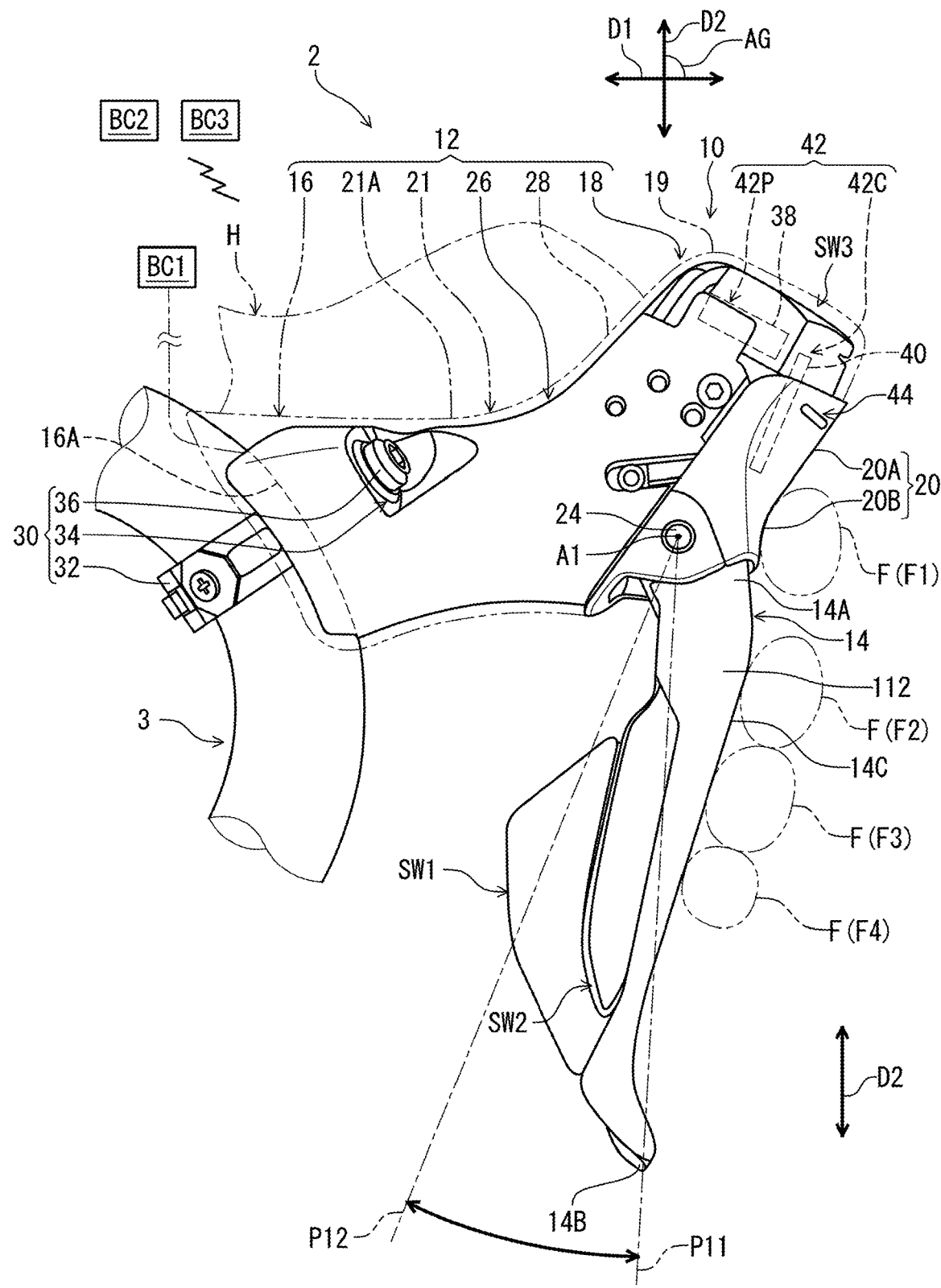
FIG. 2 is a side elevational view of the operating device illustrated in FIG. 1.

As seen in FIG. 2, the operating device 10 for the human-powered vehicle 2 comprises a base member 12 and an operating member 14. The base member 12 is configured to be coupled to the handlebar 3. The base member 12 extends in a longitudinal direction D1. The base member 12 includes a first end portion 16 and a second end portion 18. The first end portion 16 has a coupling surface 16A configured to be coupled to the handlebar 3. The second end portion 18 is opposite to the first end portion 16 in the longitudinal direction D1. The second end portion 18 constitutes a free end portion of the base member 12.

The second end portion 18 includes a pommel portion 19 and an end surface 20. The pommel portion 19 extends obliquely upward with respect to the longitudinal direction D1. The end surface 20 extends from the pommel portion 19. The end surface 20 is arranged on a reverse side of the coupling surface 16A in the longitudinal direction D1.

The base member 12 includes a grip portion 21 provided between the first end portion 16 and the second end portion 18 in the longitudinal direction D1. The grip portion 21 includes a grip surface 21A on which a user's hand H is arranged. The second end portion 18 is provided on a reverse side of the grip surface 21A. The pommel portion 19 extends obliquely upward from the grip portion 21 with respect to the longitudinal direction D1.

The operating member 14 is movably coupled to the base member 12. The operating member 14 is movably coupled to the base member 12 about a pivot axis A1 between a rest position P11 and an operated position P12. The pivot axis A1 is provided closer to the second end portion 18 than to the first end portion 16. The operating member 14 includes a proximal end portion 14A and a distal end portion 14B opposite to the proximal end portion 14A.

The operating device 10 includes a pivot shaft 24 defining the pivot axis A1. The pivot shaft 24 pivotally couples the operating member 14 to the base member 12. The rest position P11 and the operated position P12 are defined by the pivot axis A1 and the distal end portion 14B.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of a device such as the operated device BC1.

The operating member 14 extends from the proximal end portion 14A to the distal end portion 14B in an extending direction D2. The extending direction D2 intersects the longitudinal direction D1 as viewed along the pivot axis A1 in a rest state where the operating member 14 is in the rest position. An angle AG defined between the extending direction D2 and the longitudinal direction D1 ranges from 40 degrees to 65 degrees in the rest state. In the present embodiment, the angle AG is 53 degrees. However, the angle AG is not limited to the present embodiment.

The operating member 14 is contactable with the rider's finger F (e.g., at least one of an index finger F1, a middle finger F2, a ring finger F3, and a little finger F4) when the operating member 14 is pivoted from the rest position P11 to the operated position P12 by the rider.

The base member 12 includes a base body 26 and a cover 28. The cover 28 is configured to be attached to the base body 26 to at least partly cover the base body 26. The cover 28 is configured to be detachably attached to the base body 26 to at least partly cover the base body 26. The cover 28 includes the grip surface 21A. For example, the cover 28 is made of a non-metallic material such as an elastic material. Examples of the elastic material include rubber. A rider sometimes grips the base member 12 (e.g., the grip portion 21) and leans on the base member 12 (e.g., the grip portion 21) during riding. The cover 28 can be omitted from the base member 12. Thus, the cover 28 can also be referred to as a grip cover.

The term "detachable" or "detachably," as used herein, encompasses a configuration in which an element is repeatedly detachable from and attachable to another element without substantial damage.

The switches SW1 and SW2 are mounted to the operating member 14 to be movable relative to the base member 12 along with the operating member 14. The switch SW3 is mounted to the base member 12. The switch SW3 is provided to the second end portion 18. The switch SW3 is provided between the base member 12 and the cover 28. The switch SW3 is configured to be operated by the user via the cover 28. However, the positions of the switches SW1, SW2, and SW3 are not limited to the present embodiment.

The operating device 10 further comprises a mounting structure 30 configured to couple the first end portion 16 to the handlebar 3. The mounting structure 30 preferably includes a band clamp 32 and a tightening member 34. The tightening member 34 is configured to couple the band clamp 32 to the first end portion 16. The tightening member 34 includes a mounting bolt 36 so as to clamp the handlebar 3 between the band clamp 32 and the first end portion 16. The mounting structure 30 can include other structures which is similar to the band clamp 32 and which is used in a road shifter for mounting to a drop-down handlebar.

As seen in FIG. 2, the operating device 10 for the human-powered vehicle 2 comprises a power supply 38 and circuitry 40. At least one of the power supply 38 and the circuitry 40 is at least partly provided at the second end portion 18. In the present embodiment, both the power supply 38 and the circuitry 40 are entirely provided at the second end portion 18. However, at least one of the power supply 38 and the circuitry 40 can be at least partly provided at portions other than the second end portion 18.

The power supply 38 is configured to supply electricity to the circuitry 40 and other components. Examples of the power supply 38 include a primary battery, a secondary battery, and a capacitor. For example, the power supply 38 includes a button cell shaped as a flat cylinder. However, the power supply 38 is not limited to the present embodiment.

The base member 12 includes an accommodating part 42. The accommodating part 42 is provided to the second end portion 18. The accommodating part 42 is configured to accommodate at least one of the power supply 38 and the circuitry 40. The accommodating part 42 is configured to accommodate the power supply 38 and the circuitry 40. Specifically, the accommodating part 42 includes a power-supply accommodating part 42P and a circuitry accommodating part 42C. The power-supply accommodating part 42P is configured to accommodate the power supply 38. The circuitry accommodating part 42C is configured to accommodate the circuitry 40. However, the accommodating part 42 can be configured to accommodate only one of the power supply 38 and the circuitry 40. One of the power-supply accommodating part 42P and the circuitry accommodating part 42C can be omitted from the accommodating part 42.

As seen in FIG. 2, the operating device 10 for the human-powered vehicle 2 comprises an indicator 44. The indicator 44 is configured to indicate information relating to the human-powered vehicle 2. The indicator 44 is configured to electrically indicate information relating to the human-powered vehicle 2. Examples of the information relating to the human-powered vehicle 2 include a battery level of the power supply, a communication status of a communicator, a pairing mode and/or status of a wireless communicator, an error of a system of the human-powered vehicle 2, and a mode and/or status of the operating device 10 and/or other components. However, the information relating to the human-powered vehicle 2 is not limited to the above examples.

The indicator 44 is provided at one of the base member 12 and the operating member 14. In the present embodiment, the indicator 44 is provided at the base member 12. The indicator 44 is provided at the base body 26. The indicator 44 is provided to the end surface 20. The indicator 44 is provided to the end surface 20 so as to be exposed from the cover 28. However, the indicator 44 can be provided at portions other than the end surface 20. The indicator 44 can be provided at portions other than the base body 26. The indicator 44 can be provided at portions other than the base member 12. The indicator 44 can be provided at the operating member 14. The indicator 44 can be provided to the end surface 20 so as to be covered by the cover 28.

Figure 3:
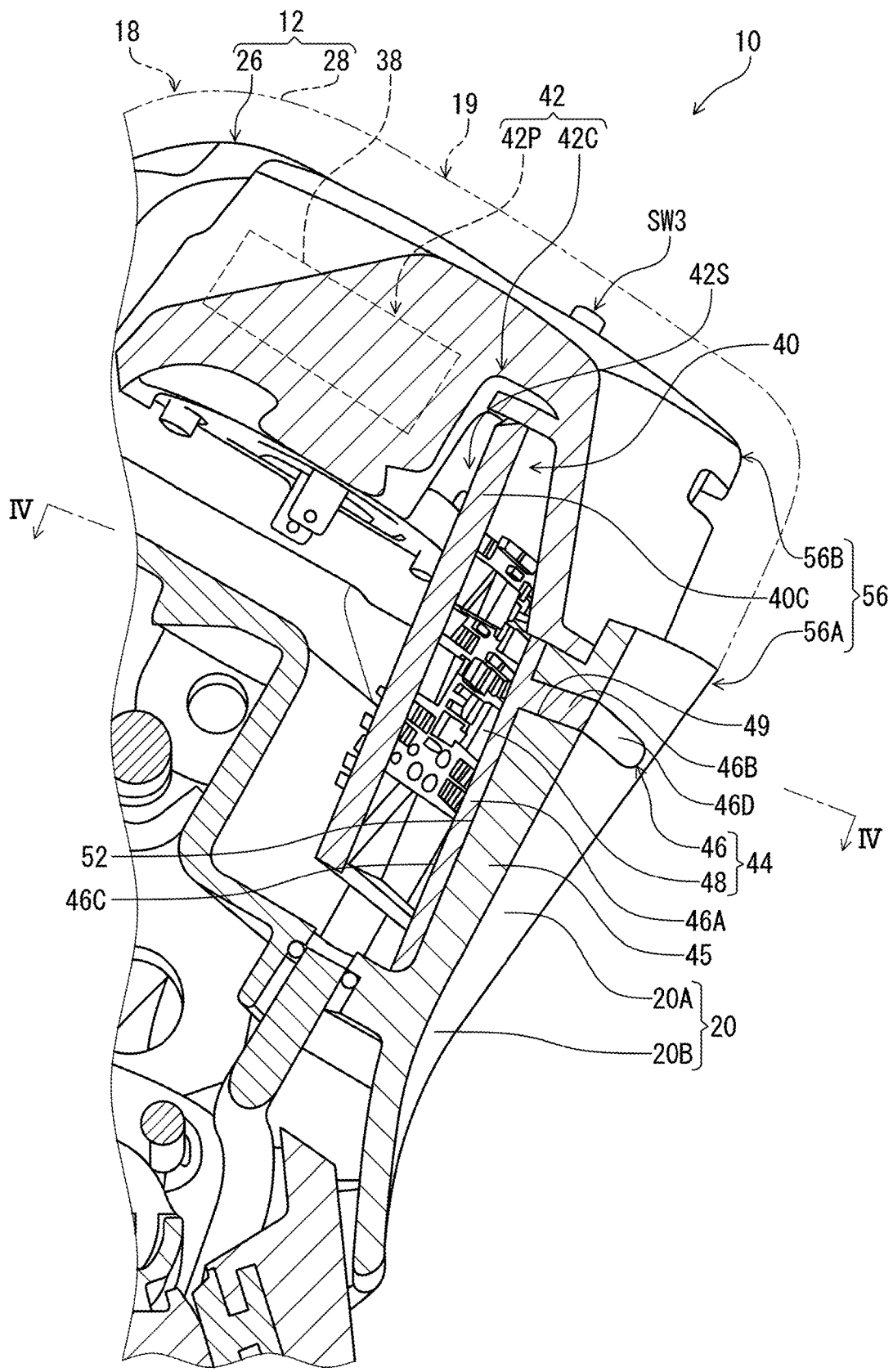
FIG. 3 is a partial cross-sectional view of the operating device taken along line III-III of FIG. 4.

As seen in FIG. 3, the end surface 20 includes an inclined surface 20A. The inclined surface 20A is configured to face downward in a mounting state where the coupling surface 16A is coupled to the handlebar 3 (FIG. 3). The inclined surface 20A is configured to face obliquely downward in the mounting state where the coupling surface 16A is coupled to the handlebar 3 (FIG. 3). The inclined surface 20A is inclined relative to the longitudinal direction D1. The indicator 44 is provided to the inclined surface 20A of the end surface 20. However, the indicator 44 can be provided to surfaces other than the inclined surface 20A. The inclined surface 20A can be omitted from the end surface 20.

The second end portion 18 includes an end wall 45. The end wall 45 includes the end surface 20. The end surface 20 includes a curved surface 20B. The curved surface 20B is continuously connected to the inclined surface 20A. The curved surface 20B has a curved shape as viewed along the pivot axis A1. The curved surface 20B is concave toward the first end portion 16 in the longitudinal direction D1 as viewed along the pivot axis A1. The curved surface 20B is configured to position the rider's finger F. The curved surface 20B is configured to position the rider's finger F with respect to the base member 12. However, the end surface 20 can include another shape instead of or in addition to the curved shape as viewed along the pivot axis A1.

The indicator 44 includes a light transmission member 46. The indicator 44 includes a light emitter 48 configured to emit light. The light emitter 48 is provided in a position where light emitted from the light emitter 48 passes through the light transmission member 46 to an outside space of the operating device 10. Examples of the light emitter 48 include a light emitting diode (LED).

The light transmission member 46 is integrally provided to the base member 12. The light transmission member 46 is integrally provided to the base body 26. The light transmission member 46 is provided to the base body 26 so as to be exposed from the cover 28. The light transmission member 46 is provided to the end surface 20 of the second end portion 18. The light transmission member 46 is embedded in the end surface 20.

In the present embodiment, the light transmission member 46 includes a first light transmission part 46A and a second light transmission part 46B. The first light transmission part 46A is provided in the base body 26. The first light transmission part 46A is provided in the accommodating part 42. The first light transmission part 46A is provided in the circuitry accommodating part 42C. The accommodating part 42 includes an accommodating space 42S. The second light transmission part 46B protrudes from the first light transmission part 46A. The base body 26 includes an indicator opening 49. The end wall 45 includes the indicator opening 49. The indicator opening 49 extends from the accommodating space 42S to the end surface 20. The second light transmission part 46B is provided in the indicator opening 49.

The circuitry 40 includes a circuit board 40C. The light emitter 48 is electrically mounted on the circuit board 40C. The circuitry 40 and the light emitter 48 are provided in the accommodating space 42S.

Figure 4:
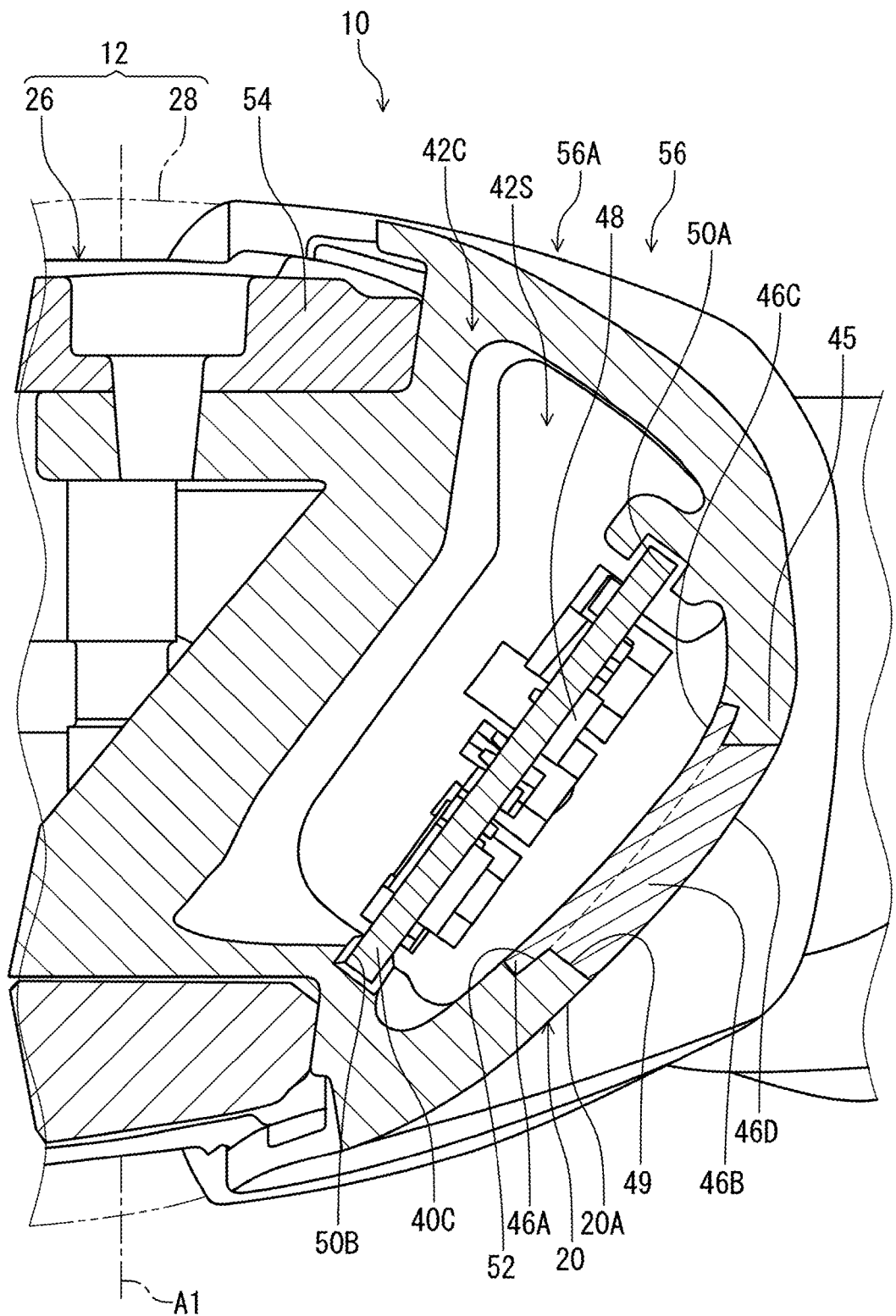
FIG. 4 is a partial cross-sectional view of the operating device taken along line IV-IV of FIG. 3.

As seen in FIG. 4, the base member 12 includes a first support groove 50A and a second support groove 50B. The circuit board 40C is provided in the first support groove 50A and the second support groove 50B. The circuit board 40C is spaced apart from the end wall 45.

The light transmission member 46 includes a light receiving surface 46C configured to receive light emitted from the light emitter 48. The light transmission member 46 includes a light emitting surface 46D provided on the end surface 20. The light emitting surface 46D is configured to emit light received by the light receiving surface 46C. The first light transmission part 46A includes the light receiving surface 46C. The second light transmission part 46B includes the light emitting surface 46D.

The end wall 45 includes a recess 52 provided in the circuitry accommodating part 42C. The indicator opening 49 extends from the recess 52 to the end surface 20 of the base member 12. The first light transmission part 46A is provided in the recess 52.

For example, the light transmission member 46 is formed by molding. Examples of the molding include injection molding (e.g., injection compression molding, injection press molding, in-mold coating, two-color molding, multi-color molding, sandwich molding, ultra-high-speed injection molding) and extrusion molding (e.g., various kinds of profile extruded articles, sheets, and films). Preferably, the light transmission member 46 is formed by the two-color molding. The light transmission member 46 is integrally bonded with the base body 26 without fasteners such as screws or an adhesive agent. The light transmission member 46 can be formed by processes other than the molding.

The base body 26 is made of a colored material which is free of light transparency or which has first light transparency. The end surface 20 is made of a colored material which is free of light transparency or which has first light transparency. In the present embodiment, the colored material is free of light transparency. However, the color material can have the first light transparency.

The light transmission member 46 is made of a transparent material. The transparent material has light transparency. The transparent material has second light transparency. The second light transparency is higher than the first light transparency of the end surface 20. The second light transparency is higher than the first light transparency of the base body 26.

In the present embodiment, the light transmission member 46 is made of a colored transparent material having light transparency. Namely, the transparent material of the light transmitting member 46 includes the colored transparent material. The colored transparent material has the second light transparency higher than the first light transparency of the base body 26. However, the light transmission member 46 can be made of a colorless transparent material. In the present embodiment, the second light transparency ranges from 1.5% to 15%. The second light transparency ranges from 3% to 4%. However, the second light transparency is not limited to the above ranges.

Figure 5:
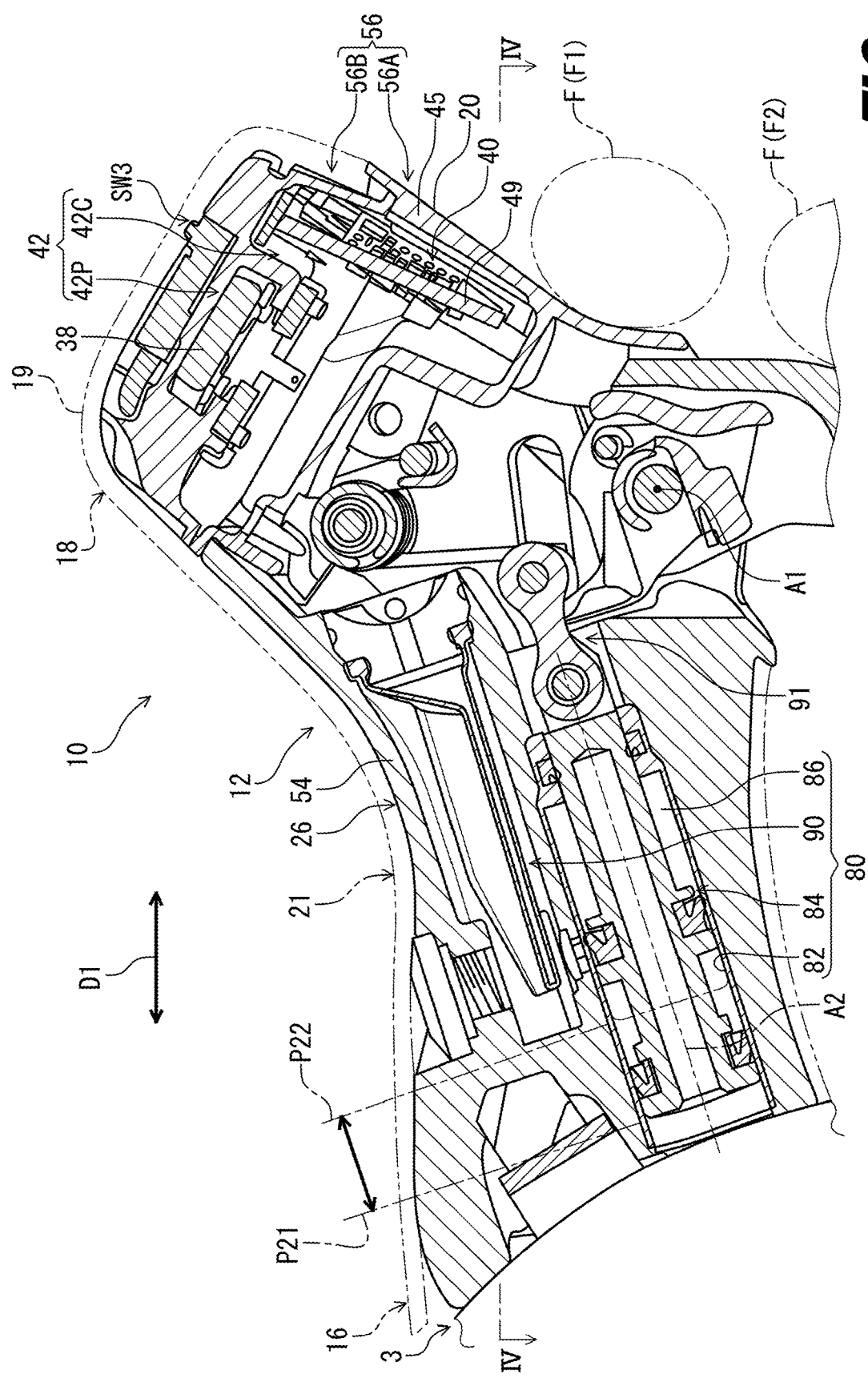
FIG. 5 is a cross-sectional view of the operating device taken along line V-V of FIG. 1.

As seen in FIG. 5, the base body 26 includes a main body 54 provided between the first end portion 16 and the second end portion 18. The base body 26 includes an attachment member 56 including the end surface 20. The attachment member 56 is made of a first material. The main body 54 is made of a second material different from the first material. The first material includes a resin material. The second material includes a resin material. Radio wave interference of the attachment member 56 is lower than radio wave interference of the main body 54. Radio wave interference of the first material is lower than radio wave interference of the second material. For example, the first material includes a glass fiber reinforced material. The main body 54 is made of a second material different from the first material. The second material includes a carbon fiber reinforced material. Namely, the attachment member 56 is a separate member from the main body 54. The glass fiber reinforced material includes grass fibers and a resin material such as synthetic resin. The carbon fiber reinforced material includes carbon fibers and a resin material such as synthetic resin. However, the first material and the second material are not limited to the present embodiment. The first material can be the same as the second material. The first material may include any robust material with radio wave interference equal to radio wave interference of the second material. The attachment member 56 is configured to be detachably attached to the main body 54. However, the attachment member 56 can be integrally provided with the main body 54 as a one-piece unitary member.

The main body 54 includes the first end portion 16 and the grip portion 21. The attachment member 56 includes the second end portion 18. The attachment member 56 includes a first attachment member 56A and a second attachment member 56B. The first attachment member 56A is a separate member from the second attachment member 56B. The first attachment member 56A includes the end surface 20. The accommodating part 42 is provided in the attachment member 56. The circuitry accommodating part 42C is provided in the second attachment member 56B. The power-supply accommodating part 42P is provided in the first attachment member 56A and the second attachment member 56B. The power supply 38 is configured to be provided in the second attachment member 56B. The circuitry 40 is configured to be provided in the first attachment member 56A and the second attachment member 56B. The switch SW3 is attached to the second attachment member 56B. As seen in FIG. 3, the light transmission member 46 and the light emitter 48 are configured to be provided in the first attachment member 56A.

Figure 6:
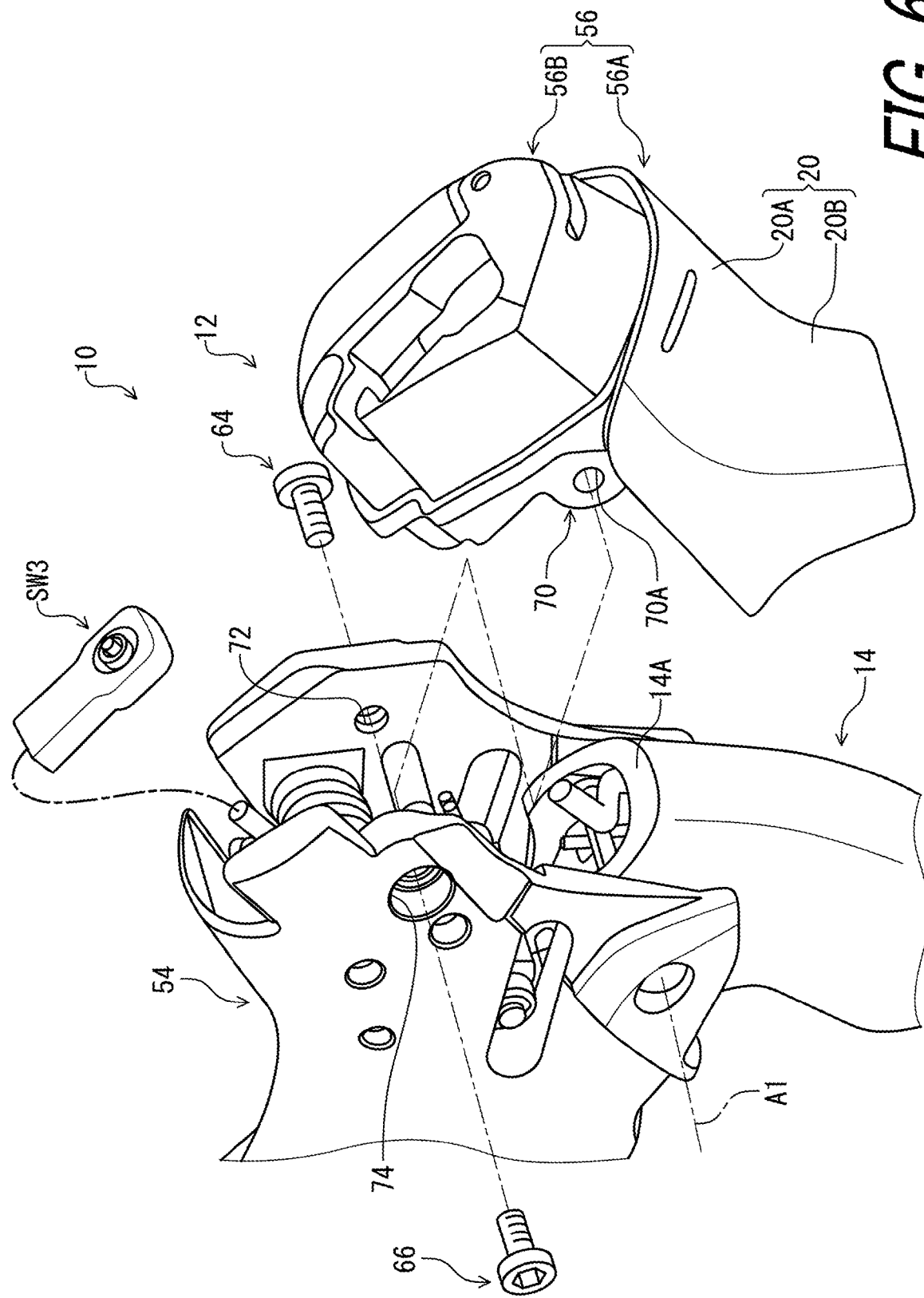
FIG. 6 is an exploded perspective view of a base member of the operating device illustrated in FIG. 1.
Figure 7:
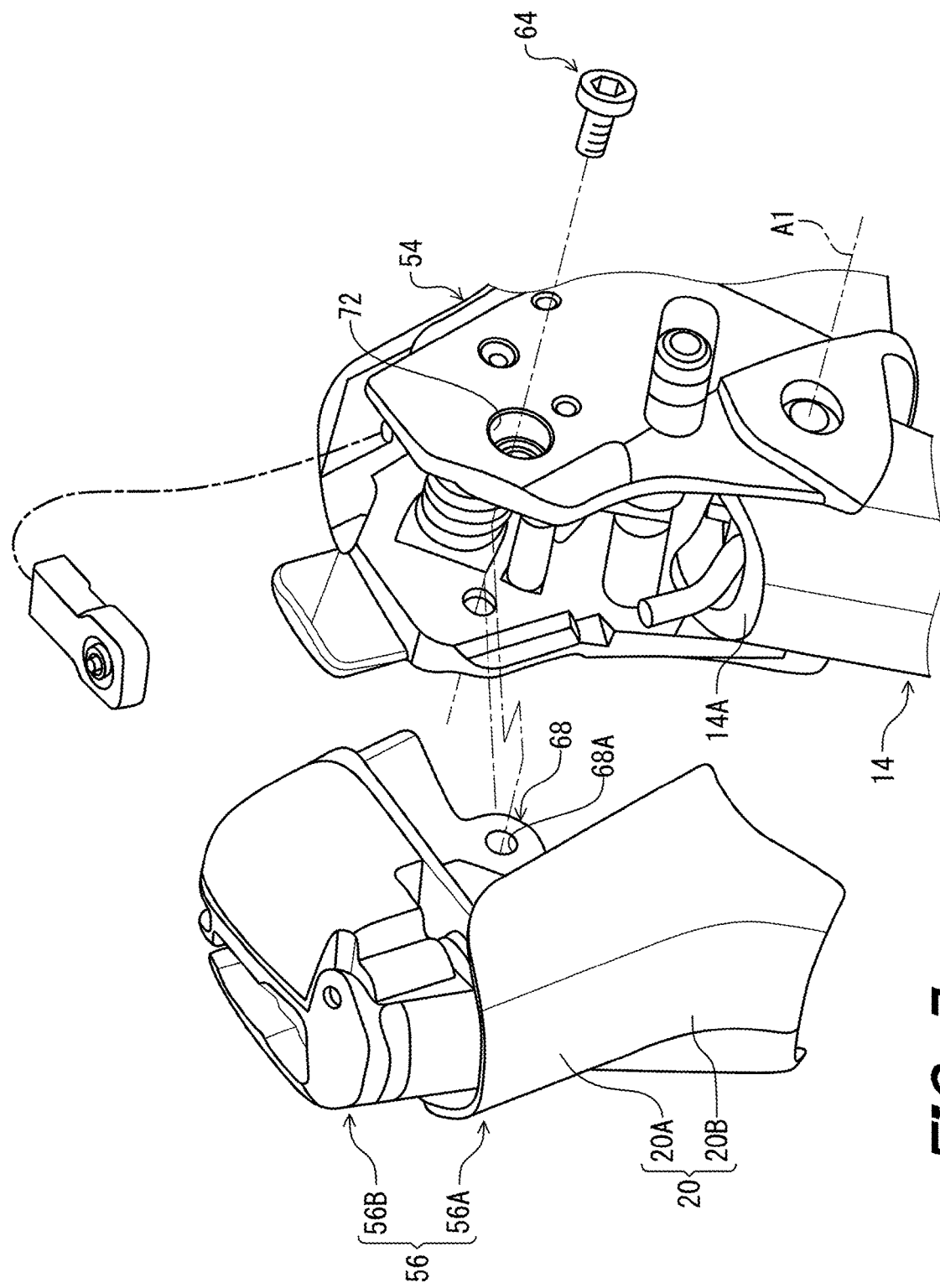
FIG. 7 is an exploded perspective view of a base member of the operating device illustrated in FIG. 1.

As seen in FIGS. 6 and 7, the attachment member 56 is configured to be detachably attached to the main body 54. The attachment member 56 is detachable from the main body 54 without removing the operating member 14 from the base member 12. The attachment member 56 is configured to be detachably attached to the main body 54 with a first fastener 64 and a second fastener 66. The attachment member 56 includes a first receiving part 68 and a second receiving part 70. The first receiving part 68 includes a first threaded hole 68A. The second receiving part 70 includes a second threaded hole 70A. The main body 54 includes a first through-hole 72 and a second through-hole 74. The first fastener 64 is configured to extend through the first through-hole 72 and to be threadedly engaged in the first threaded hole 68A of the first receiving part 68 in a state where the attachment member 56 is attached to the main body 54. The second fastener 66 is configured to extend through the second through-hole 74 and to be threadedly engaged in the second threaded hole 70B of the second receiving part 70 in the state where the attachment member 56 is attached to the main body 54. However, the attachment member 56 can be configured to be detachably attached to the main body 54 with a structure other than the first fastener 64 and the second fastener 66.

Figure 8:
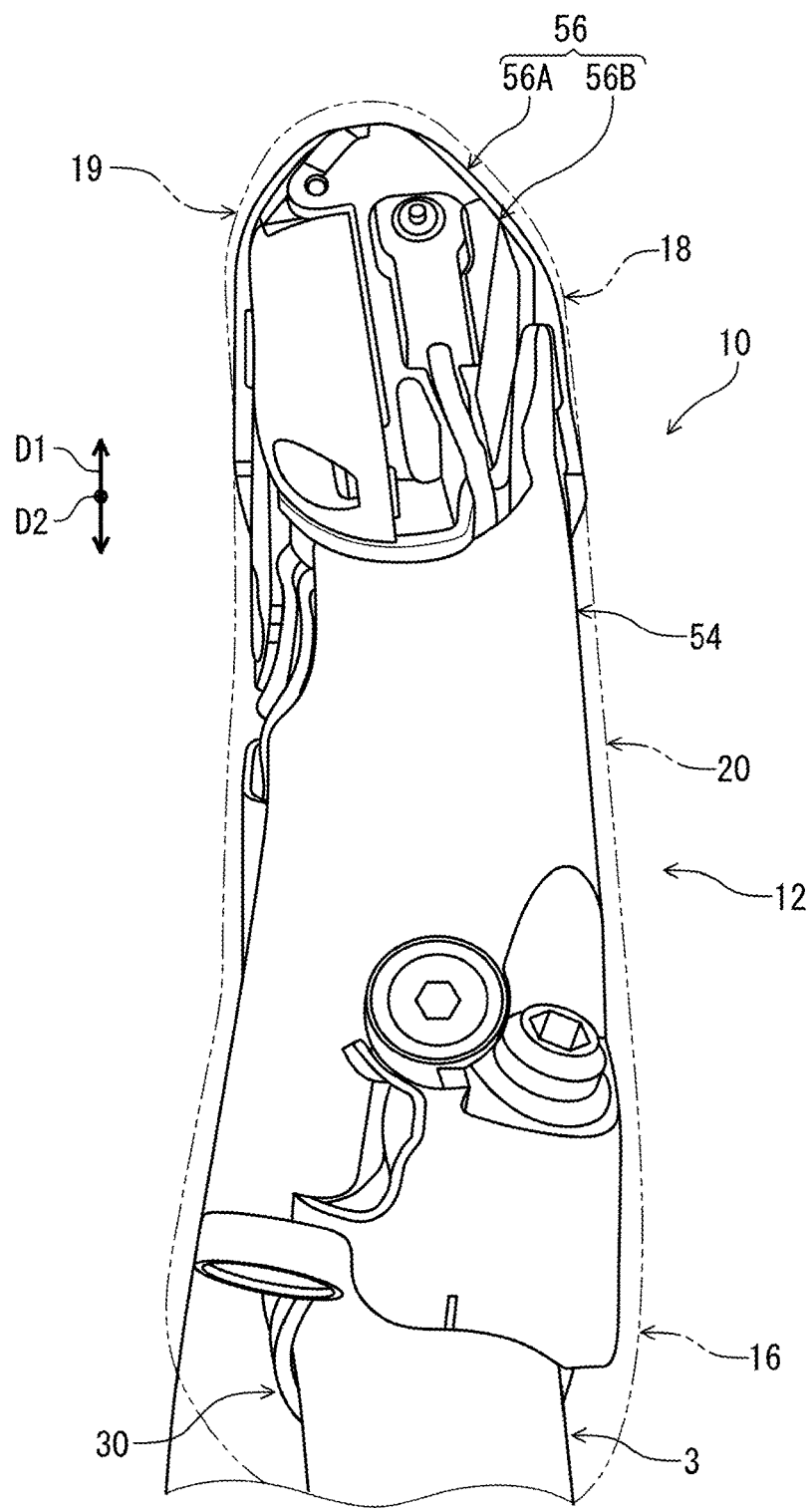
FIG. 8 is a plan view of the operating device illustrated in FIG. 1, with a handlebar.

As seen in FIG. 8, the indicator 44 (see, e.g., FIG. 2) is arranged so as to be hidden from sight as viewed along the extending direction D2 from the pommel portion 19. The indicator 44 (see, e.g., FIG. 2) is arranged so as to be hidden from sight as viewed along the extending direction D2 from the pommel portion 19 in the rest state where the operating member 14 is in the rest position P11 (see, e.g., FIG. 2). However, the indicator 44 (see, e.g., FIG. 2) can be arranged so as not to be hidden from sight as viewed along the extending direction D2 from the pommel portion 19 in the rest state where the operating member 14 is in the rest position P11 (see, e.g., FIG. 2).

Figure 9:
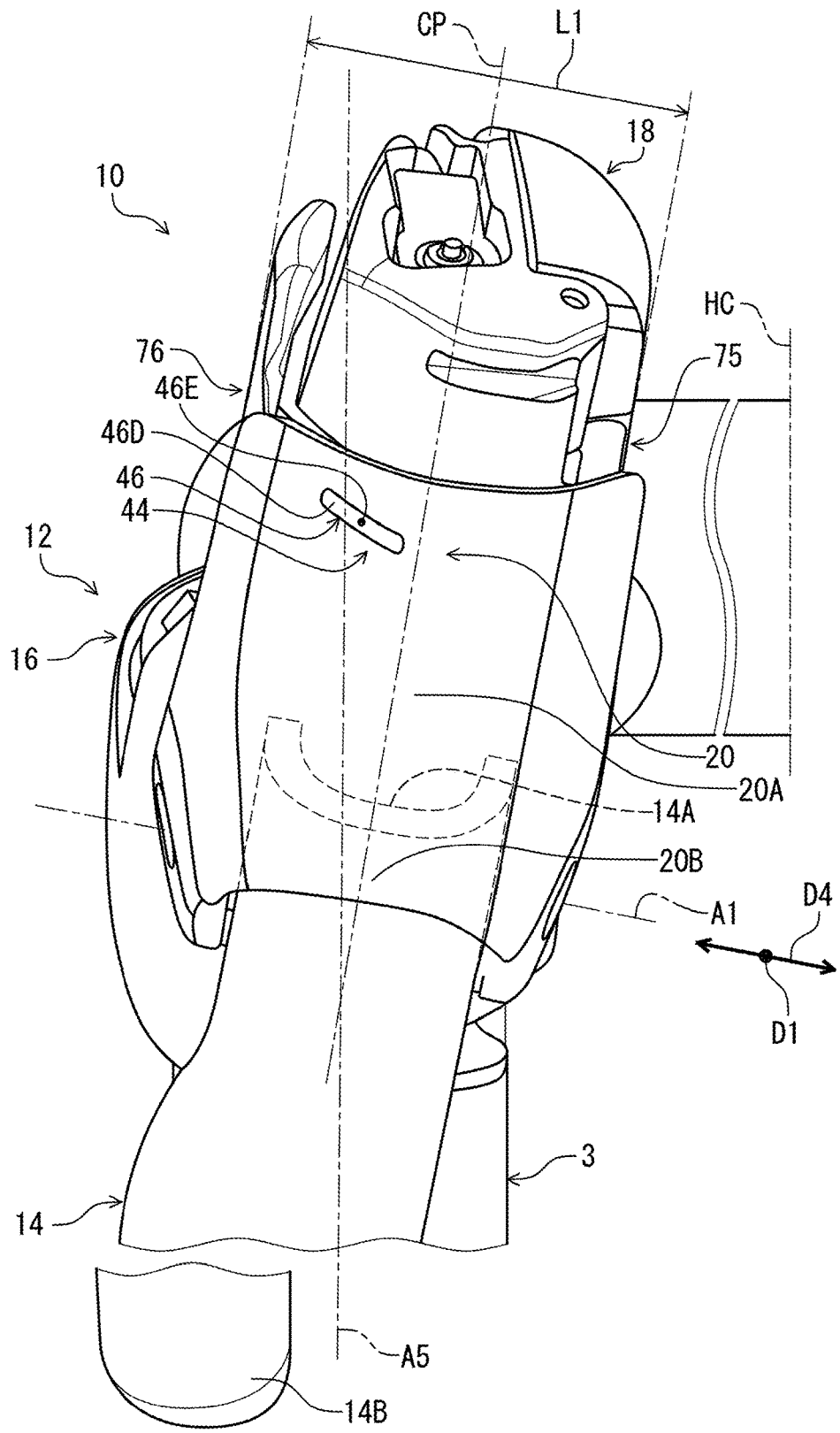
FIG. 9 is a front view of the operating device illustrated in FIG. 1.

As seen in FIG. 9, the light emitting surface 46D extends along a pivot axis direction D4 with respect to the pivot axis A1 as viewed in the longitudinal direction D1. The second end portion 18 includes a lateral surface 75 and an additional lateral surface 76. The additional lateral surface 76 is provided on a reverse side of the lateral surface 75 in the pivot axis direction D4 parallel to the pivot axis A1. A center 46E of the light emitting surface 46D is offset from a transverse center plane CP of the second end portion 18 towards one of the lateral surface 75 and the additional lateral surface 76. However, the center 46E of the light emitting surface 46D can be provided on the transverse center plane CP of the second end portion 18. The light emitting surface 46D can be arranged to portions other than the pommel portion 19.

Figure 10:
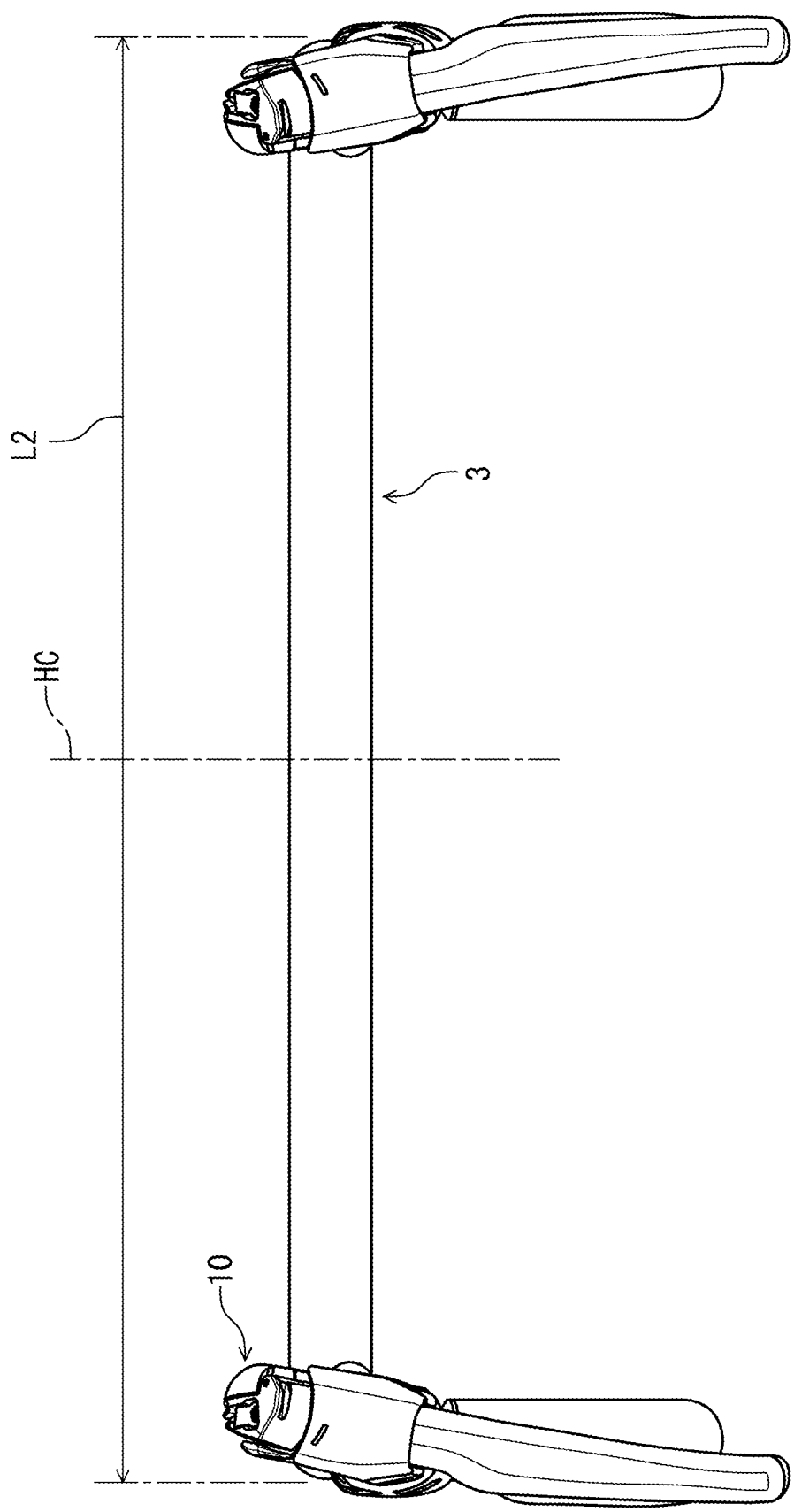
FIG. 10 is a front view of the operating device illustrated in FIG. 1, with the handlebar.

The second end portion 18 has an asymmetrical shape with respect to a transverse center plane CP of the second end portion 18. The transverse center plane CP is defined to bisect a lateral length L1 defined between the lateral surface 75 and the additional lateral surface 76. The transverse center plane CP is perpendicular to the pivot axis A1. In the present embodiment, the center 46E of the light emitting surface 46D is offset from the transverse center plane CP of the second end portion 18 towards the additional lateral surface 76. The lateral surface 75 is provided between the light emitting surface 46D and a handlebar center plane HC in the pivot axis direction D4. However, the center 46E of the light emitting surface 46D can be offset from the transverse center plane CP of the second end portion 18 towards the lateral surface 75. The additional lateral surface 76 is provided between the light emitting surface 46D and the handlebar center plane HC in the pivot axis direction D4. As seen in FIG. 10, the handlebar center plane HC bisects a lateral length L2 of the handlebar 3.

As seen in FIG. 5, the operating device 10 includes a hydraulic unit 80 provided in the base member 12. The hydraulic unit 80 is configured to generate hydraulic pressure in response to a movement of the operating member 14. For example, the hydraulic unit 80 includes a cylinder bore 82, a piston 84, a hydraulic chamber 86, a piston biasing member 88, and a reservoir 90. The cylinder bore 82 has a cylinder center axis A2. The piston 84 is movably provided in the cylinder bore 82. The cylinder bore 82 and the piston 84 define the hydraulic chamber 86. The piston biasing member 88 is configured to bias the piston 84 toward the initial position P21.

The operating device 10 comprises a coupling structure 91. The coupling structure 91 is configured to couple the piston 84 to the operating member 14. The piston biasing member 88 is configured to bias the coupling structure 91 such that the piston 84 is moved toward the initial position P21. Thus, the piston biasing member 88 is configured to bias the operating member 14 toward the rest position P11.

The piston 84 is coupled to the operating member 14 to be moved relative to the base member 12 from an initial position P21 to an actuated position P22 in response to a pivotal movement of the operating member 14 from the rest position P11 to the operated position P12. The piston 84 is coupled to the operating member 14 to be pulled in response to the pivotal movement of the operating member 14 from the rest position P11 toward the operated position P12. However, the piston 84 can be coupled to the operating member 14 to be pushed in response to the pivotal movement of the operating member 14 from the rest position P11 toward the operated position P12.

The operating device 10 comprises the hydraulic unit 80. However, the operating member 14 can be operatively coupled to another structure instead of the hydraulic unit 80. For example, the operating member 14 can be operatively coupled to a mechanical control cable such as a Bowden cable so as to operate the operated device BC1.

Figure 11:
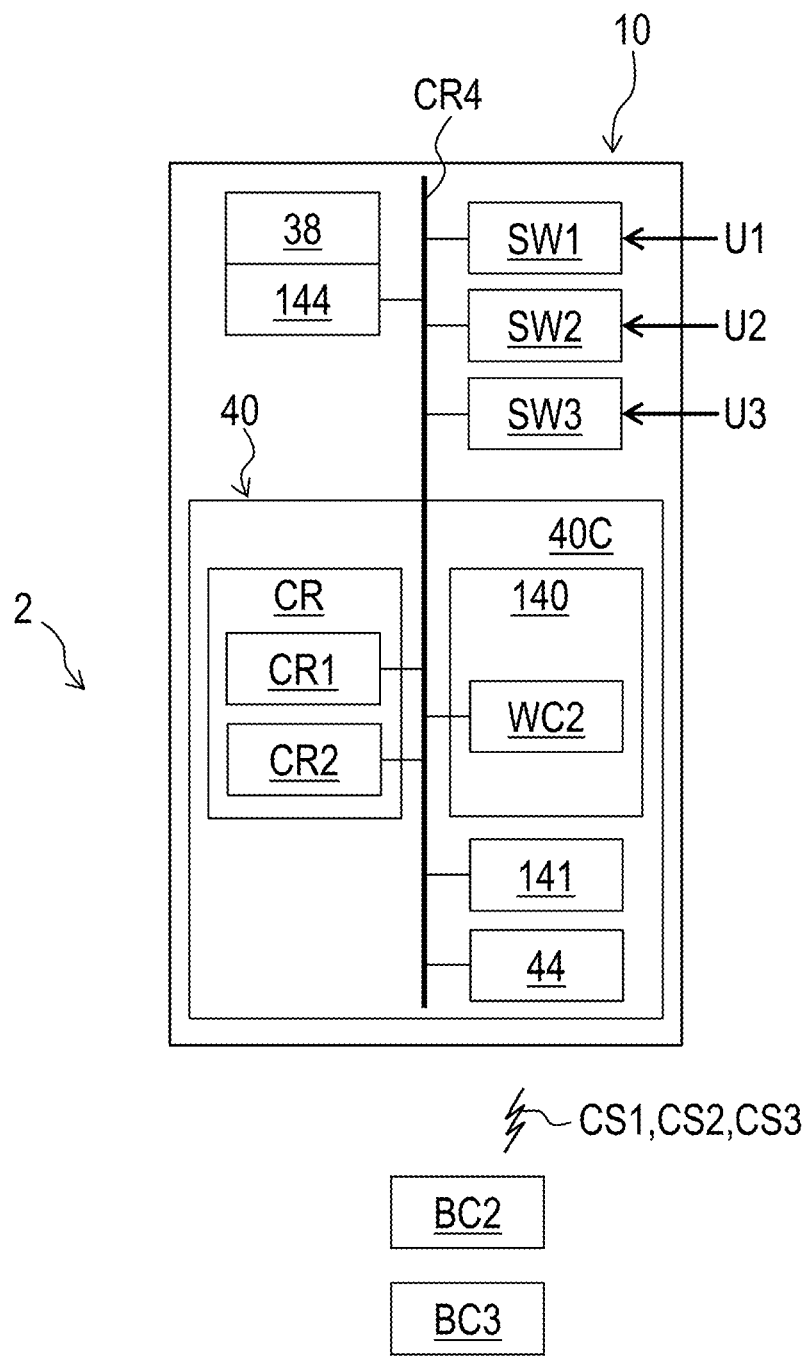
FIG. 11 is a block diagram of a human-powered vehicle including the operating device illustrated in FIG. 1.

As seen in FIG. 11, the circuitry 40 includes a communicator 140, an antenna 141, and a controller CR. The communicator 140, the antenna 141, the indicator 44, and the controller CR are electrically mounted on the circuit board 40C. The communicator 140, the antenna 141, the indicator 44, and the controller CR are electrically connected with each other via the circuit board 40C. The switches SW1, SW2, and SW3 are electrically connected to the controller CR. The power supply 38 is configured to be electrically connected to the communicator 140, the antenna 141, the indicator 44, and the controller CR via the circuit board 40C and a power-supply holder 144.

The communicator 140 is configured to communicate with another device via at least one of a wired communication channel and a wireless communication channel. In the present embodiment, the communicator 140 includes a wireless communicator WC2. The wireless communicator WC2 is configured to communicate with a wireless communicator of the electric component BC2 using the antenna 141 via a wireless communication channel. The wireless communicator WC2 is configured to communicate with a wireless communicator of the additional electric component BC3 using the antenna 141 via a wireless communication channel. However, the communicator 140 can include a wired communicator configured to communicate with a wired communicator of the electric component BC2 via a wired communication channel.

The controller CR is configured to control another device in response to the user inputs U1 to U3 and/or other information. In the present embodiment, the controller CR is configured to control the wireless communicator WC2 to transmit a control signal CS1 and/or CS2 to the electric component BC2. The controller CR is configured to control the wireless communicator WC2 to transmit a control signal CS3 to the additional electric component BC3.

In the present embodiment, the control signal CS1 indicates upshifting of the electric component BC2. The control signal CS2 indicates downshifting of the electric component BC2. The control signal CS3 indicates that the state of the additional electric component BC3 is changed between the lock state and the adjustable state.

The controller CR includes a processor CR1, a memory CR2, and a system bus CR4. The processor CR1 and the memory CR2 are electrically mounted on the circuitry 40. The processor CR1 includes a central processing unit (CPU) and a memory controller. The processor CR1 is electrically connected to the memory CR2 with the circuitry 40 and the system bus CR4. The master wired communicator and the master wireless communicator are configured to be electrically mounted on the circuitry. The wireless communicator WC2 is electrically connected to the processor CR1 and the memory CR2 with the circuitry 40 and the system bus CR4.

The memory CR2 includes a read only memory (ROM) and a random-access memory (RAM). The memory CR2 includes storage areas each having an address in the ROM and the RAM. The processor CR1 is configured to control the memory CR2 to store data in the storage areas of the memory CR2 and reads data from the storage areas of the memory CR2. The memory CR2 (e.g., the ROM) stores a program. The program is read into the processor CR1, and thereby the configuration and/or algorithm of the communicator 140 is performed.

The wireless communicator WC2 includes a signal transmitting circuit and a signal receiving circuit. The wireless communicator WC2 is configured to superimpose digital signals on carrier wave using a predetermined wireless communication protocol to wirelessly transmit the digital signal. In the present embodiment, the wireless communicator WC2 is configured to encrypt signals using a cryptographic key to generate encrypted wireless signals.

The wireless communicator WC2 is configured to receive and/or transmit a wireless signal via the antenna 141. In the present embodiment, the wireless communicator WC2 is configured to decode the wireless signal to recognize signals and/or information wirelessly transmitted from another wireless communicator. The wireless communicator WC2 is configured to decrypt the wireless signal using the cryptographic key. The wireless communicator WC2 can also be referred to as a wireless communication circuit WC2.

The controller CR is configured to generate the control signal CS1 in response to the user input U1. The controller CR is configured to generate the control signal CS2 in response to the user input U2. The controller CR is configured to generate the control signal CS3 in response to the user input U3. The controller CR is configured to control the wireless communicator WC2 to respectively transmit the control signals CS1, CS2, and CS3 via the wireless communication channel in response to the user inputs U1, U2, and U3.

The light emitter 48 is configured to emit light having a plurality of different colors. The light emitter 48 includes a single light emitter configured to emit light having a plurality of different colors. However, the light emitter 48 can include a plurality of light emitters. Each of the plurality of light emitters is configured to emit light having a single color different from a color of another of the light emitter 48 elements.

The controller CR is configured to control the indicator 44 to emit light based on the information relating to the human-powered vehicle 2. The controller CR is configured to control light emitted from the light emitter 48. In the present embodiment, the controller CR is configured to turn on and off the light emitter 48 based on the information relating to the human-powered vehicle 2. The controller CR is configured to control the light emitter 48 so as to change a color of the light emitted from the light emitter 48. The controller CR is configured to control the light emitter 48 so as to change a lighting pattern of the light emitted from the light emitter 48.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
   a base member extending in a longitudinal direction, the base member including
   a first end portion having a coupling surface configured to be coupled to a handlebar, and
   a second end portion opposite to the first end portion in the longitudinal direction, the second end portion including a pommel portion and an end surface extending from the pommel portion, the end surface being arranged on a reverse side of the coupling surface in the longitudinal direction, the end surface facing away from the handlebar in a mounting state where the coupling surface is coupled to the handlebar;

an operating member movably coupled to the base member about a pivot axis between a rest position and an operated position, the operating member extending from a proximal end portion to a distal end portion in an extending direction; and an indicator configured to indicate information relating to the human-powered vehicle, the indicator being provided to the end surface.

2. The operating device according to claim 1, wherein the indicator is arranged so as to be hidden from sight as viewed along the extending direction from the pommel portion.

3. The operating device according to claim 1, wherein the base member includes a grip portion provided between the first end portion and the second end portion in the longitudinal direction, the grip portion includes a grip surface on which a user's hand is arranged, and the second end portion is provided on a reverse side of the grip surface.

4. The operating device according to claim 1, wherein the indicator includes a light transmission member provided to the end surface of the second end portion.

5. The operating device according to claim 4, wherein the light transmission member is made of a transparent material having light transparency.

6. The operating device according to claim 4, wherein the indicator includes a light emitter configured to emit light, and the light emitter is provided in a position where light emitted from the light emitter passes through the light transmission member to an outside space of the operating device.

7. The operating device according to claim 6, wherein the light emitter is configured to emit light having a plurality of different colors.

8. The operating device according to claim 4, wherein the end surface is made of a colored material which is free of light transparency or which has first light transparency, and the light transmission member is made of a transparent material having second light transparency higher than the first light transparency of the end surface.

9. The operating device according to claim 4, wherein the light transmission member includes a light emitting surface provided on the end surface, and the light emitting surface extends along a pivot axis direction with respect to the pivot axis as viewed in the longitudinal direction.

10. The operating device according to claim 1, wherein the end surface includes an inclined surface configured to face downward in the mounting state where the coupling surface is coupled to the handlebar, and the indicator is provided to the inclined surface of the end surface.

11. The operating device according to claim 1, wherein the end surface is closer to the operating member than the pommel portion.

12. An operating device for a human-powered vehicle, comprising:

a base member extending in a longitudinal direction, the base member including a first end portion having a coupling surface configured to be coupled to a handlebar, and a second end portion opposite to the first end portion in the longitudinal direction, the second end portion including a pommel portion and an end surface extending from the pommel portion, the end surface being arranged on a reverse side of the coupling surface in the longitudinal direction;

an operating member movably coupled to the base member about a pivot axis between a rest position and an operated position, the operating member extending from a proximal end portion to a distal end portion in an extending direction; and an indicator configured to indicate information relating to the human-powered vehicle, the indicator being provided to the end surface, wherein the base member includes a base body and a cover configured to be attached to the base body to at least partly cover the base body, and the indicator is provided to the end surface so as to be exposed from the cover.

13. An operating device for a human-powered vehicle, comprising:

a base member extending in a longitudinal direction, the base member including a first end portion having a coupling surface configured to be coupled to a handlebar, and a second end portion opposite to the first end portion in the longitudinal direction, the second end portion including a pommel portion and an end surface extending from the pommel portion, the end surface being arranged on a reverse side of the coupling surface in the longitudinal direction;

an operating member movably coupled to the base member about a pivot axis between a rest position and an operated position, the operating member extending from a proximal end portion to a distal end portion in an extending direction; and an indicator configured to indicate information relating to the human-powered vehicle, the indicator being provided to the end surface, wherein the indicator includes a light transmission member provided to the end surface of the second end portion, and the light transmission member is embedded in the end surface.

14. An operating device for a human-powered vehicle, comprising:

a base member extending in a longitudinal direction, the base member including a first end portion having a coupling surface configured to be coupled to a handlebar, and a second end portion opposite to the first end portion in the longitudinal direction, the second end portion including a pommel portion and an end surface extending from the pommel portion, the end surface being arranged on a reverse side of the coupling surface in the longitudinal direction;

an operating member movably coupled to the base member about a pivot axis between a rest position and an operated position, the operating member extending from a proximal end portion to a distal end portion in an extending direction; and an indicator configured to indicate information relating to the human-powered vehicle, the indicator being provided to the end surface, wherein the indicator includes a light transmission member provided to the end surface of the second end portion, the second end portion includes a lateral surface and an additional lateral surface provided on a reverse side of the lateral surface in a pivot axis direction parallel to the pivot axis, the light transmission member includes a light emitting surface provided on the end surface, and a center of the light emitting surface is offset from a transverse center plane of the second end portion towards one of the lateral surface and the additional lateral surface.

15. An operating device for a human-powered vehicle, comprising:

a base member configured to be coupled to a handlebar;

an operating member movably coupled to the base member; and an indicator configured to indicate information relating to the human-powered vehicle, the indicator including a light transmission member provided to the base member, the light transmission member being made of a transparent material having light transparency, the light transmission member being a one-piece member having a light receiving surface and a light emitting surface configured to emit light received by the light receiving surface, the light receiving surface having a size different from a size of the light emitting surface.

16. The operating device according to claim 15, wherein the indicator is provided at one of the base member and the operating member.

17. The operating device according to claim 15, wherein the indicator includes a light emitter configured to emit light, and the light emitter is provided in a position where light emitted from the light emitter passes through the light transmission member to an outside space of the operating device.

18. The operating device according to claim 15, wherein the light transmission member is formed by molding.

19. The operating device according to claim 15, wherein the light receiving surface being larger than the light emitting surface.

20. An operating device for a human-powered vehicle, comprising:

a base member configured to be coupled to a handlebar;

an operating member movably coupled to the base member; and an indicator configured to indicate information relating to the human-powered vehicle, the indicator including a light transmission member integrally provided to the base member, the light transmission member being made of a colored transparent material having light transparency, wherein the base member includes a base body and a cover attached to the base body to cover the base body, and the light transmission member is provided to the base body so as to be exposed from the cover.

21. The operating device according to claim 20, wherein the base body is made of a colored material which is free of light transparency or which has first light transparency, and the light transmission member is made of a transparent material having second light transparency higher than the first light transparency of the base body.

22. An operating device for a human-powered vehicle, comprising:

a base member extending in a longitudinal direction, the base member including a first end portion having a coupling surface configured to be coupled to a handlebar, and a second end portion opposite to the first end portion in the longitudinal direction, the second end portion including an end surface arranged on a reverse side of the coupling surface in the longitudinal direction;

an operating member movably coupled to the base member about a pivot axis; and an indicator configured to indicate information relating to the human-powered vehicle, the indicator including a light transmission member having a light emitting surface provided to the end surface of the second end portion, wherein the second end portion includes a lateral surface and an additional lateral surface provided on a reverse side of the lateral surface in a pivot axis direction parallel to the pivot axis, and a center of the light emitting surface is offset from a transverse center plane of the second end portion towards one of the lateral surface and the additional lateral surface.

* * * * *